United States Patent Office 2,827,362
Patented Mar. 18, 1958

2,827,362

PREPARATION OF HYDROXYLAMINE

Willard C. Bull, Joplin, Harry C. Zeisig, Jr., Carl Junction, and Paul D. Strickler, Joplin, Mo., and Edwin G. Marhofer, Pittsburg, Kans., assignors to Spencer Chemical Company, a corporation of Missouri No Drawing. Application July 28, 1953
Serial No. 370,884

11 Claims. (Cl. 23—190)

This invention relates to a new process for the production of hydroxylamine salts.

Hydroxylamine is a valuable intermediate in the preparation of a number of chemical compounds. When employed as such intermediate, it is used in the form of various acid salts, since the free base is unstable.

Previously hydroxylamine salts have been produced by several methods. The classical method involves the reduction of sodium nitrite with sodium bisulfite and sulfur dioxide to give sodium hydroxylamine-N,N-disulfonate, followed by hydrolysis of the hot solution to give hydroxylammonium acid sulfate (also called hydroxylamine acid sulfate) and by-product sodium sulfate. This is an expensive process involving several steps, and results in a direct loss of at least one mole of sulfuric acid per mole of product.

A more recent commercial process involves the reaction of sulfuric acid with a nitro-paraffin such as nitromethane to produce the acid sulfate salt and by-product carbon monoxide. The raw material nitromethane is a relatively expensive one and the carbon values are a direct loss.

The present invention provides a novel and inexpensive means of synthesizing hydroxylamine salts. It uses raw materials which are cheap and available in commerce in large volume, and produces high conversion yields therefrom.

The process of the invention involves the catalytic hydrogenation of nitric acid in an aqueous or aqueous alcoholic medium at atmospheric or superatmospheric pressure and at room temperature or above, with or without the presence of acid additives.

Since the catalysts available are reactive with the acid, one of the important factors in this invention is the maintenance of hydrogen at the catalyst-acid interface. Thus, we have found it highly important that a continuous supply of hydrogen be furnished to the catalyst. The simplest way of assuring this is to keep an excess of hydrogen available and to agitate the reactive mixture constantly in such a way as to bring fresh hydrogen continuously to the catalyst.

*Catalyst.*—The catalyst is preferably active palladium, palladium oxide, platinum, or platinum oxide. We have preferred to use 5% to 10% palladium on active carbon, although other concentrations of catalyst and other carriers can be used effectively. (The percentage figures given are the percent of total catalyst and carrier weight which is represented by the active catalyst metal.)

Palladium catalysts have as little as 1% by weight of metal dispersed on carbon and on alumina supports have been used. These particular catalysts produce low conversions of the nitric acid (about 5% of hydroxylamine) but vary widely in exothermicity. Palladium on charcoal gave a temperature rise from ambient to 125° C., and in every case the catalyst dissolved. The alumina support, on the other hand gave very little temperature rise but gave the same conversion.

Platinum oxide on asbestos produced trace quantities of hydroxylamine, and platinum oxide without a carrier produced 3% hydroxylamine.

Other carriers that may be used effectively are silica gel, quartz, Pyrex, quartz-Pyrex pellets, and kieselguhr. (The term "Pyrex" is used in this specification to mean a type of glass well known to those skilled in the art which is both heat and chemical resistant.)

It might be thought that the hydrogenation catalysts would operate more effectively if all air was excluded from the reaction chamber. Some effort was made to exclude every possible trace of air by flushing the reaction system with hydrogen several times before introducing the catalyst. However, palladium catalysts, at least, seem to be unaffected by the presence or absence of air.

The amount of catalyst used may be varied widely without greatly affecting the conversion, but at very low concentrations of catalyst the reaction rate is reduced. For example, we have successfully used as much as 0.15 gm. palladium per gram of nitric acid, and as little as 0.004 gm. of palladium per gram of nitric acid. However, using 0.004 gm. per gram of nitric acid results in lower conversion. (See Example 8 below.)

We prefer to operate in the range of 0.005 to 0.05 gm. of palladium per gram of nitric acid to secure optimum yields, minimize inevitable catalyst losses, and reduce catalyst inventory to the lowest possible level.

The catalysts and associated carriers are preferably used in the reaction mixture of this invention in powdered form. However, they may also be used in any other form (granular, for instance) that assures the maintenance of a continuous supply of hydrogen at the catalyst-acid interfaces.

The acid should not be present with the catalyst for any extended period before the catalyst is brought into contact with the hydrogen. When pre-contact times of less than nine minutes were employed at room temperatures, the reduction normally proceeded satisfactorily.

*Acid additive.*—There may be present during the hydrogenation acid additives such as sulfuric, acetic, formic, and phosphoric acids. Of these sulfuric, phosphoric, and formic acids appear to be superior, with sulfuric being clearly the best of all. (See Examples 1 through 4 below.)

Apparently almost any acid forming a relatively stable salt with hydroxylamine can be used. The only acid we tried which did not work was hydrochloric; this acid produced catalyst solution. However, it is believed that under the right conditions hydrochloric acid could probably be used successfully.

*Additive not essential.*—While the use of an additive may be desirable, it is not absolutely necessary, since good conversions to hydroxylamine can be obtained without such additives.

One advantage to using no acid additive is that the reduction of the nitric acid can be carried to a predetermined pressure drop indicating a desired percentage reduction of the nitric acid present. This generally results in shorter reaction times than when an acid additive is used, since in the latter case the reduction is ordinarily carried out until there is no further pressure drop.

If no acid additive is used, the percentage reduction of the nitric acid should never be taken to more than 50%, or the reaction mixture will become basic due to the formation of hydroxylamine and ammonia. In such case the nitric acid and hydroxylamine would be completely reduced to ammonia.

*Optimum molecular ratio of acids.*—Using sulfuric acid as an additive, we have found that with low concentrations of nitric acid the best results are obtained when the mole ratio of sulfuric to nitric acid lies in the range between about 0.5 to 1 and about 1.5 to 1. (See Example 5 below.)

We have also found that the optimum ratio of sulfuric to nitric acid depends in part on the concentration of the nitric acid. With still lower concentrations of nitric acid than those just referred to, we have found that a substantial conversion to hydroxylamine salts is obtained even when the mole ratio of sulfuric to nitric acid is about 4 to 1. (See Example 6 below.) On the other hand, with higher concentrations of nitric acid substantial conversion is obtained only when the mole ratio of sulfuric to nitric acid is no higher than somewhere between 1.0 to 1 and 1.5 to 1. (See Example 7 below.)

*Corrosion.*—We have found that when sulfuric acid is used as an additive severe corrosion occurs in the hydrogenation reactor and in the pumps and lines handling the mixed acids prior to reduction. We have found that stainless steels of the 18–8 class and many other corrosion resistant metals and metal alloys are not suitable materials of construction.

In general, we prefer to use non-ferrous materials such as glass, Saran, polyethylene, Teflon, and ceramics. For example, we have found a glass lined autoclave to be a perfectly satisfactory reaction vessel.

The two acids may also be injected separately into an agitated reactor with equally good conversion results and substantially reduced maintenance problems.

Corrosion problems are substantially reduced if nitric acid is hydrogenated alone with no added acid.

*Concentration of nitric acid.*—Our work has indicated that when nitric acid is reduced without an acid additive, there is a critical maximum concentration of nitric acid above which this process is inoperable because of catalyst solution. For example, runs carried out at 50 p. s. i. g. (pounds per square inch, gauge) and at approximately room temperature were not successful when concentration of more than 24.5% nitric acid were used.

However, at a temperature of 0° C. and 50 p. s. i. g. nitric acid concentrations as high as 40% nitric acid have been successfully reduced by the method of this invention. Further lowering of the reaction temperature may increase the critical maximum for the nitric acid concentration to a still higher figure.

Other modifications of the conditions of the process may also increase this critical maximum figure. It is pointed out below, for instance, that catalyst solution seems to be a function of the hydrogen pressure, and it is quite possible that increasing the pressure will raise the critical maximum nitric acid concentration.

*Alcohol as solvent.*—In addition to the aqueous solution nitric acid and acid additives referred to, we have found that use of an aqueous alcoholic medium produces good results.

Seventy percent nitric acid was diluted to 24.5% with an alcohol such as methanol and then reduced in the usual manner. The conversion of nitric acid to hydroxylamine was comparable with that obtained in an aqueous solution, and the rate of reduction was actually faster. (See Example 10 below.)

*Pressure.*—The reaction rate varies with pressure, the rate being increased as the pressure under which the reaction is carried out is increased. This effect is more marked at higher acid concentrations than at lower; apparently in the latter case the rate of migration of the ions (rather than the elemental hydrogen) to the catalyst is more important.

Increased pressure helps to maintain the hydrogen at the catalyst-acid interface, and thereby reduces solution of the catalyst in the acid medium. However, increased pressure also tends to produce more ammonia, which (as noted below) is a by-product of the reduction of the nitric acid.

We have found our process to be operable at pressures as high as 4500 p. s. i. g. At least when sulfuric acid is used as an additive, however, increased pressure is only mildly beneficial in its effect on reaction rate and conversion to hydroxylamine. Thus, with sulfuric acid present we prefer to operate in the range of atmospheric pressure to about 300 p. s. i. g. as being more economical equipmentwise with only slightly lower yields of hydroxylamine.

*Temperature.*—The reaction rate in this invention also varies with temperature. Higher temperatures increase the rate of reaction considerably.

However, there is an upper limit to the temperature which may be used. In the first place, if the initial temperature of the reaction mixture is too high, the catalyst will go into solution in the acid before the reduction can proceed, especially if the catalyst is in contact with a fairly high concentration of acid for too long a time before hydrogen is introduced. In addition, it is probable that if the initial temperature is too high the nitric acid may react with the reducing agent hydroxylamine. Under any system we have so far devised, we have found the maximum desirable starting temperature to be about 45° C.

There is also an upper limit above which the temperature of the mixture should not be permitted to rise at any time during the reaction. This is determined by the temperature above which the catalyst will go into solution for the acid system, temperature, and pressure used, and the temperature at which the hydroxylamine end-products of the reaction will decompose.

The latter factor sets an upper limit of 170° C. when the acid additive is sulfuric acid. However, we consider that the upper practical limit of temperature to avoid solution of the catalyst in the acid systems we have employed is about 125° C. Reduced reaction temperatures down to about freezing point of the reaction mixture may also be used although obviously at extremely low temperatures reaction is very slow. In fact, for ease of control of this exothermic reaction we prefer to operate under controlled temperature conditions in the range of normal room temperatures or normal cooling water temperatures.

*Ammonia by-product.*—Active catalysts generally co-produce some ammonia in addition to the hydroxylamine produced in this reduction. (See Examples 1, 4–8, and 10 below). It seems to make little difference in this respect whether an acid additive is used or not.

However, when an aqueous alcoholic medium was used as described above, more than the usual amount of ammonia was formed.

To keep down the production of ammonia, it is better to use alumina as support for the palladium catalyst than to use carbon. When alumina is used, the hydroxylamine to ammonia ratio has been found to be very much larger than with the carbon supported catalyst.

*Other by-products.*—The material balances on the reduction of straight nitric acid have normally shown about a 10% loss of nitrogen. In only a very few cases has it been possible to obtain 100% material balances using straight nitric acid for the reduction. This has been true despite the fact that runs have been duplicated to the maximum extent possible under the laboratory operating conditions.

Considerably better material balances were obtained when mixed acids were used.

Under some circumstances excessive amounts of nitrogen are formed during the reduction of the nitric acid, even though the reduction proceeds to normal hydroxylamine and ammonia conversion. It has been found that the formation of excessive nitrogen can be avoided by initially evacuating the catalyst and pressuring it with hydrogen before the addition of the acid reaction mixture.

The following examples will more particularly show the detailed practice of our invention, but are not to be considered as limiting. In these examples conversion is expressed as percent of nitric acid which is converted to hydroxylamine or ammonia; acid concentrations are expressed in terms of moles of 100% acid; catalyst concentration is percent by weight of metal to total weight of catalyst; and catalyst weight is that of metal plus carrier. The apparatus and agitation procedure used in Example 1 were also used in all the other examples.

*Example 1*

A mixture containing 0.026 mole $HNO_3$, 0.035 mole $H_2SO_4$, 8.3 moles water, and 0.5 gm. 10% palladium on active carbon was placed in a glass bottle in a Parr hydrogenation apparatus equipped with a rocking device, and hydrogen was introduced to an initial pressure of 50 p. s. i. g. at room temperature. There was a pressure drop of 6.5 p. s. i. g. after 45 minutes of agitation of this mixture.

Fifty-nine percent of the nitric acid was converted to hydroxylamine and 7% to ammonia.

*Example 2*

A mixture containing 0.026 mole $HNO_3$, 0.035 mole $H_3PO_4$, 8.3 moles water, and 0.5 gm. 10% palladium on active carbon was reduced at an initial hydrogen pressure of 50 p. s. i. g. and at room temperature for 55 minutes. The pressure drop was four p. s. i. g.

Analysis showed a nitric acid conversion of 35% to hydroxylamine and no ammonia formed.

*Example 3*

A mixture containing 0.035 mole $HNO_3$, 0.035 mole formic acid, 8.3 moles water, and 0.5 gm. 10% palladium on active carbon was reduced at an initial hydrogen pressure of 50 p. s. i. g. and at room temperature for 60 minutes. The pressure drop was 3.5 p. s. i. g.

Twenty-two percent of the nitric acid was reduced to hydroxylamine. No analysis for ammonia was made.

*Example 4*

A mixture containing 0.035 mole $HNO_3$, 0.035 mole acetic acid, 8.3 moles water, and 0.5 gm. 10% palladium on active carbon was reduced at an initial hydrogen pressure of 50 p. s. i. g. and at room temperature for 40 minutes. The pressure drop was 1.0 p. s. i. g.

Nitric acid conversions of 5% to hydroxylamine and 2% to ammonia were found by analysis of the reaction mixture.

*Example 5*

Mixtures containing 0.035 mole $HNO_3$, 8.3 moles water, 0.5 gm. 10% palladium on active carbon, and various amounts of sulfuric acid were hydrogenated for various lengths of time at an initial pressure of 50 p. s. i. g. and at room temperature to give the pressure drops and analyses indicated below:

| | Sulfuric Acid | | Mole Ratio, $H_2SO_4/HNO_3$ | Time, Mins. | Pressure Drop, p. s. i. g. | Conversion in percent to— | |
|---|---|---|---|---|---|---|---|
| | Moles | Wt. Percent | | | | $NH_2OH$ | $NH_3$ |
| A | 0.009 | 0.585 | 0.26 | 120 | 10.4 | 0 | 17 |
| B | 0.018 | 1.162 | 0.51 | 60 | 9.0 | 42 | 5 |
| C | 0.035 | 2.236 | 1.0 | 135 | 7.9 | 44 | 4 |
| D | 0.043 | 2.733 | 1.2 | 44 | 7.2 | 41 | 4 |
| E | 0.070 | 4.373 | 2.0 | 40 | 1.1 | 6 | 1 |

NOTE.—In this specification, the weight percent of acid is expressed as though all the water present was associated with the acid concerned.

These particular hydrogenation runs clearly show that at low nitric acid concentrations the optimum range for sulfuric acid to nitric acid ratio lies well within about 0.26 to 1 and about 2.0 to 1. The ratio producing the highest conversion to hydroxylamine in the shortest time seems to be about 1.2 to 1, or 6 to 5.

*Example 6*

Mixtures containing 0.035 mole $H_2SO_4$, 8.3 moles water, 0.5 gm. 10% palladium on active carbon and various amounts of nitric acid were hydrogenated at an initial pressure of 50 p. s. i. g. and at room temperature for various lengths of time to give the results shown below:

| | Nitric Acid | | Mole Ratio, $H_2SO_4/HNO_3$ | Time, Mins. | Pressure Drop, p. s. i. g. | Conversion in percent to— | |
|---|---|---|---|---|---|---|---|
| | Moles | Wt. Percent | | | | $NH_2OH$ | $NH_3$ |
| A | 0.008 | 0.335 | 4.4 | 60 | 1.9 | 25 | |
| B | 0.018 | 0.750 | 1.9 | 65 | 7.1 | 49 | |
| C | 0.035 | 1.445 | 1.0 | 135 | 7.9 | 44 | 4 |
| D | 0.070 | 2.856 | 0.50 | 60 | 12.0 | 24 | |
| E | 0.140 | 5.224 | 0.25 | 120 | 9.0 | 2 | |

These particular runs indicate that at low sulfuric acid concentrations a sulfuric acid to nitric acid ratio between about 1.0 to 1 and about 2.0 to 1 is most effective, although substantial conversion of the nitric acid was still obtained when the ratio was as high as 4.4 to 1 and as low as 0.50 to 1. The ratio producing the highest conversion to hydroxylamine in the shortest time seems to be about 2.0 to 1.

*Example 7*

Mixtures containing 0.096 mole $HNO_3$, 8.3 moles water, 0.5 gm. 10% palladium on active carbon, and various amounts of sulfuric acid were hydrogenated at an initial pressure of 50 p. s. i. g. at room temperature for various lengths of time to give the results shown below:

| | Sulfuric Acid, Moles | Mole Ratio, $H_2SO_4/HNO_3$ | Time, Mins. | Conversion in percent to— | |
|---|---|---|---|---|---|
| | | | | $NH_2OH$ | $NH_3$ |
| A | 0.048 | 0.5 | 195 | 51 | 35. |
| B | 0.096 | 1.0 | 180 | 52 | 27. |
| C | 0.144 | 1.5 | 120 | 0 | 3 ($NO_2$ fumes). |
| D | 0.192 | 2.0 | 120 | 0 | Trace ($NO_2$ fumes). |

Comparing these results to Example 5 shows that as nitric acid concentration is increased from 0.035 to 0.096 mole the top figure for the optimum range for sulfuric to nitric acid ratio is lowered to somewhere in the vicinity of 1.0 to 1. The ratio producing the highest conversion to hydroxylamine in the shortest time appears also to be about 1.0 to 1.

*Example 8*

Mixtures containing the indicated amounts of $HNO_3$, 0.015 mole $H_2SO_4$, 8.3 moles water, and the indicated amounts of palladium on active carbon were hydrogenated at room temperature for various lengths of time at the pressures shown with results as follows:

A. Atmospheric pressure (0.012 mole $HNO_3$ each run)—

| | Catalyst | | Time, Mins. | Conversion in percent to— | | Gms. Pd per gm. $HNO_3$ |
|---|---|---|---|---|---|---|
| | Type | Quantity in gms. | | $NH_2OH$ | $NH_3$ | |
| 1 | 10% Pd on C | 1.0 | 165 | 43 | 27 | 0.132 |
| 2 | do | 0.85 | 135 | 47 | 23 | 0.112 |
| 3 | do | 0.7 | 135 | 49 | 20 | 0.093 |
| 4 | do | 0.5 | 180 | 49 | 24 | 0.066 |
| 5 | do | 0.2 | 150 | 47 | 23 | 0.026 |
| 6 | do | 0.1 | 270 | 45 | 22 | 0.013 |

B. Initial pressure 50 p. s. i. g. (0.096 mole HNO₃ each run)—

| | Catalyst | | Time, Mins. | Conversion in percent to— | | Gms. Pd per gm. HNO₃ |
|---|---|---|---|---|---|---|
| | Type | Quantity in gms. | | NH₂OH | NH₃ | |
| 1 | 10% Pd on C | 0.25 | 240 | 17 | 17 | 0.004 |
| 2 | do | 0.5 | 180 | 52 | 33 | 0.008 |
| 3 | do | 1.0 | 150 | 50 | 14 | 0.016 |
| 4 | do | 2.0 | 120 | 48 | 18 | 0.033 |
| 5 | 5% Pd on C | 0.5 | 300 | 5 | 2 | 0.004 |
| 6 | do | 1.0 | 150 | 59 | 31 | 0.008 |
| 7 | do | 2.0 | 120 | 51 | 28 | 0.016 |

From these results, it is clear that in the neighborhood of 0.004 gm. palladium per gram of nitric acid conversion falls off sharply. It is further to be noted that when the catalyst of B (5) is increased in amount as in B (6) and B (7) it performs excellently in much less time.

*Example 9*

Aqueous mixtures containing 65 ml. of 24.5% HNO₃ and 1 gm. of 5% palladium on active carbon were hydrogenated at an initial pressure of 50 p. s. i. g. and over 50% of the nitric acid reduced was converted to hydroxylamine. (The percentage of nitric acid reduced was in practically all cases held to approximately 35% in these runs, by stopping the reduction after that predetermined percentage had been reached.)

Similar runs at lower acid concentrations gave a considerable amount of nitrogen formed during the reaction, although the conversion rate to hydroxylamine remained essentially constant.

*Example 10*

Mixtures containing 65 ml. of 24.5% HNO₃ (prepared by diluting 70% HNO₃ with methanol to a concentration of 24.5%) and 1 gm. of 5% palladium on active carbon were hydrogenated at an initial pressure of 50 p. s. i. g. and room temperature.

Conversions to hydroxylamine were comparable to the aqueous runs of Example 9, although ammonia formation was greater.

*Example 11*

Aqueous mixtures containing 60 ml. of approximately 40% HNO₃ and 1 gm. of 5% palladium on active carbon were hydrogenated at an initial pressure of 51 p. s. i. g. and at 0° to 5° C. for 145 minutes. Approximately 17% of the nitric acid was reduced, and of this over 50% was converted to hydroxylamine.

Runs similar to Example 1 above have been carried out using successively alumina, asbestos, charcoal, silica gel, quartz, quartz-Pyrex pellets, and kieselguhr carriers for the palladium catalyst, with conversion yields to hydroxylamine in each case.

Runs similar to Example 1 above have been carried out using successively palladium oxide, platinum, and platinum oxide as the catalyst, and substantial conversion yields to hydroxylamine were obtained in each case.

It is important to understand that while for simplicity we have spoken in the above examples of conversions to hydroxylamine base, the actual product obtained was a hydroxylamine acid salt. Thus when sulfuric acid is used as the additive hydroxylamine sulfate and ammonium sulfate are produced in the reaction mixture, and if no acid additive is used hydroxylamine nitrate and ammonium nitrate are produced.

The hydroxylamine salts can be separated from the reaction mixture by means well known to those skilled in the art.

The foregoing detailed description has been given for clearness of understanding only. No unnecessary limitations should be understood therefrom, as modifications will be obvious to those skilled in the art.

We claim:

1. The process of producing hydroxylamine which comprises: bringing together a member of the group consisting of (a) a solution consisting essentially of aqueous nitric acid and (b) an aqueous solution consisting essentially of nitric acid and an acid of the group consisting of acetic, formic, and mineral acids excluding nitric acid and hydrochloric acid; hydrogen; and an active hydrogenation catalyst; at a temperature from above the freezing point of the reaction mixture to a temperature of 170° C.; and providing said hydrogen at the catalyst-acid interface at least prior to any appreciable dissolution of the catalyst so that dissolution of the catalyst is prevented, and maintaining hydrogen at the interface during reaction; and recovering the hydroxylamine so produced.

2. The process of claim 1 in which the reaction is effected at about 0° C. to 125° C.

3. The process of claim 2 in which the catalyst is selected from the group consisting of palladium, palladium oxide, platinum and platinum oxide.

4. The process of claim 3 in which the catalyst is supported on an acid insoluble carrier selected from the group consisting of activated carbon, charcoal, alumina, asbestos, silica gel, quartz, pyrex, quartz-pyrex pellets and kieselguhr.

5. The process of claim 1 in which the catalyst is an active palladium catalyst supported on an inert carrier, with the palladium metal concentration lying between 0.005 and .05 gram of palladium per gram of nitric acid, and a reaction temperature from 0° C. to 125° C.

6. The process of claim 1 in which the concentration of nitric acid in terms of the water present is no greater than 40% by weight.

7. The process of claim 1 in which the hydrogen is supplied at an initial superatmospheric pressure.

8. The process of claim 1 in which the reaction is carried out at a pressure in the range of 0 to 500 pounds per square inch gauge pressure with continual agitation.

9. The process of claim 1 in which the mixture is agitated during reaction.

10. The process of claim 1 in which nitric acid and sulfuric acid are present in the ratio of one-half to four moles of nitric acid to a mole of sulfuric acid.

11. The process of claim 10 in which the catalyst is active palladium supported on powdered carbon and the reaction is carried out at a pressure in the range of 0 to 500 pounds per square inch gauge pressure with continual agitation.

References Cited in the file of this patent

UNITED STATES PATENTS

| 2,628,888 | Benson | Feb. 17, 1953 |
| 2,628,889 | Benson | Feb. 17, 1953 |

OTHER REFERENCES

J. W. Mellor's "A Comprehensive Treatise on Inorganic and Theoretical Chemistry," vol. 8, 1928 ed., pages 430, 582. Longmans, Green and Co., N. Y.

U. S. DEPARTMENT OF COMMERCE
PATENT OFFICE
CERTIFICATE OF CORRECTION

Patent No. 2,827,362            March 18, 1958

Willard C. Bull et al.

It is hereby certified that error appears in the printed specification of the above numbered patent requiring correction and that the said Letters Patent should read as corrected below.

Column 1, line 64, for "have as" read --having as--; line 67, for "of", second occurrence, read --to--; column 3, line 38, for "concentration" read --concentrations--; column 4, line 35, after "about" insert --the--.

Signed and sealed this 29th day of April 1958.

(SEAL)
Attest:

KARL H. AXLINE
Attesting Officer

ROBERT C. WATSON
Commissioner of Patents